UNITED STATES PATENT OFFICE.

JOSEPH W. McCAUGHEY, OF GENEVA, OHIO.

POLISHING COMPOSITION.

1,407,074. Specification of Letters Patent. Patented Feb. 21, 1922.

No Drawing. Application filed May 28, 1921. Serial No. 473,383.

*To all whom it may concern:*

Be it known that I, JOSEPH W. McCAUGHEY, a citizen of the United States, residing at Geneva, in the county of Ashtabula and State of Ohio, have invented certain new and useful Improvements in Polishing Compositions, of which the following is a specification.

This invention has as its object to provide an improved polishing composition for use in imparting a high and lasting luster to furniture, pianos, automobiles, and in fact any varnished or similarly highly finished surface.

The composition embodying the invention consists of a mixture of the following ingredients in about the proportions stated.

| | |
|---|---|
| Paraffin oil | 37 gals. |
| Turpentine | 2½ gals. |
| Yellow-pine oil | 3 qts. |
| Camphor oil | 1 qt. |
| Cedarwood oil | 1 qt. |
| Sassafras oil | 1 qt. |
| Beeswax | 2½ lbs. |

In compounding the composition, I place the turpentine in a porcelain vessel and add to it the beeswax and then heat slowly and stir continuously until the wax has been thoroughly dissolved. To this solution of the wax and turpentine I then add the yellow pine oil slowly, stirring in the meanwhile, and allow the mixture to cool. I then add the cedarwood oil, next the camphor oil, and finally the sassafras oil and after all of these ingredients have been thoroughly stirred together, the mixture is added to the paraffin oil and the whole is again stirred vigorously until the mixture is uniform throughout.

The mixture is to be applied in any convenient manner such for example as by a sprayer and the surface to which it is applied is then polished with a dry cloth.

The polish is of such composition that it will impart to a varnish or other surface a high luster, and it will furthermore act as a preservative of such a surface because of the nature of its ingredients.

Having thus described the invention, what is claimed as new is:

1. A polishing composition comprising a mixture of paraffin oil, turpentine, yellow pine oil, camphor oil, cedar oil, sassafras oil and beeswax.

2. A polishing composition comprising a mixture of the following ingredients in about the proportions stated:—paraffin oil, thirty-seven gallons, turpentine, two and one-half gallons, yellow pine oil, three quarts, camphor oil, 1 quart, cedarwood oil, 1 quart, sassafras oil, 1 quart, beeswax, two and one-half pounds.

In testimony whereof I affix my signature.

[L. S.] JOSEPH W. McCAUGHEY.